(12) United States Patent
Yoon et al.

(10) Patent No.: US 6,555,048 B1
(45) Date of Patent: Apr. 29, 2003

(54) METHOD FOR MANUFACTURING TUBE-SHAPED SILICA GLASS PRODUCT

(75) Inventors: Young-Sik Yoon, Kyongsangbuk-do (KR); Young-Min Baik, Kyongsangbuk-do (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 206 days.

(21) Appl. No.: 09/642,764

(22) Filed: Aug. 22, 2000

(30) Foreign Application Priority Data

Aug. 26, 1999 (KR) ............................................. 99-35602

(51) Int. Cl.[7] ........................ C04B 33/32; C03B 37/016
(52) U.S. Cl. ........................ 264/621; 264/635; 264/671; 264/672; 65/395
(58) Field of Search .......................... 65/395; 264/621, 264/635, 671, 672

(56) References Cited

U.S. PATENT DOCUMENTS

| | | | |
|---|---|---|---|
| 3,512,571 A | * 5/1970 | Phelps | |
| 4,786,302 A | * 11/1988 | Osafune et al. | ............... 65/3.11 |
| 5,352,259 A | 10/1994 | Oku et al. | ..................... 65/412 |
| 5,769,921 A | 6/1998 | Yokokawa | ..................... 65/412 |
| 5,922,099 A | * 7/1999 | Yoon et al. | ..................... 65/395 |
| 6,091,500 A | 7/2000 | Bahr et al. | ................... 356/384 |

FOREIGN PATENT DOCUMENTS

GB     2 041 913 A     9/1980

* cited by examiner

Primary Examiner—Christopher A. Fiorilla
(74) Attorney, Agent, or Firm—Robert E. Bushnell, Esq.

(57) ABSTRACT

A silica product, method and apparatus for manufacturing a tube-shaped silica glass product using a molded green body having a hollow rod structure. A molded green body having a hollow rod structure has a uniform outer diameter and has a bore having an inner diameter increasing gradually from one end to the other. When sintered in a vertically movable sintering furnace, a tube-shaped silica glass product having a longitudinal cross section distribution less than a tolerance limit may be obtained. Optical fiber manufactured using the silica glass tube according to the present invention may have a uniform longitudinal geometrical structure, thereby exhibiting superior transmission characteristics.

11 Claims, 5 Drawing Sheets

400

METHOD FOR MANUFACTURING TUBE-SHAPED SILICA GLASS PRODUCT

CLAIM OF PRIORITY

This application makes reference to, incorporates the same herein, and claims all benefits accruing under 35 U.S.C. §119 from an application for MANUFACTURE METHOD FOR SILICA GLASS OF TUBE TYPE earlier filed in the Korean Industrial Property Office on the Aug. 26, 1999 and there duly assigned Serial No. 35602/1999.

BACKGROUND OF THE INVENTION

1. Field of the Invention

The present invention relates to silica glass and to a method for manufacturing silica glass, and more particularly to silica glass products and to a method for manufacturing a tube-shaped silica glass product.

2. Description of the Prior Art

In the manufacture of optical fiber, which is a high-speed and low-loss data transmission medium, both methods of directly drawing an optical fiber from a liquid material, for example, a double crucible process, and methods of drawing the optical fiber from a rod-shaped preform are known. Among methods of drawing an optical fiber from a preform, various methods respectively using different preform formation processes are known; for instance, the modified chemical vapor-phase deposition (MCVD) process. In accordance with this method, a preform is formed by depositing a vapor-phase material on the inner or outer surface of a substrate tube.

Another method involves forming a preform by molding a core rod and an over-jacketing tube, and interconnecting the rod and tube to form the preform. Both the substrate tube of the modified chemical vapor-phase deposition process and the over-jacket tube are made of silica glass in the form of tubes, and these are usually made by using a sol-gel method.

In a general method of manufacturing a preform, a silica glass tube is manufactured using a mixing/dispersing process, a molding process, a de-molding process, a drying process, an organic substance treating process, and a sintering process. An example of this method is disclosed in U.S. Pat. No. 5,240,488, to Chandross et al., entitled Manufacture Of Vitreous Silica Product Via A Sol-Gel Process Using A Polymer Additive.

In the mixing/dispersing procedure, a starting material is mixed with deionized water and an additive such as a dispersing agent, so that the starting material is uniformly dispersed in the deionized water, thereby forming a uniform sol. The starting material may include silicon alkoxide or fumed silica. A dispersion process using silicon alkoxide is disclosed in U.K. Patent No. 2,041,913. A dispersion process using fumed silica is disclosed in U.S. Pat. No. 4,419,115, to Johnson, Jr. et al, entitled Fabrication Of Sintered High Silica Glasses.

In the molding procedure, the sol produced in the mixing/dispersing procedure is charged into a mold having a proper shape for gelation. The sol is added with a binder and a gelling agent to aid in forming particle-to-particle bonds. The mold, which is used to mold a silica glass tube, for example, a substrate tube or an over-jacket tube, has a construction including a cylindrical portion and a central rod portion inserted in the cylindrical portion.

In the de-molding procedure, the gel molded to have a tube shape in the molding procedure is removed from the mold. This procedure may be carried out in a water tank to prevent the gel tube from being damaged.

In the drying procedure, the gel tube removed from the mold is dried using a dryer with a constant temperature and humidity chamber.

In the organic substance treating procedure, the gel tube is subjected to a thermal treatment at a low temperature in order to remove or decompose residual moisture and any organic substances, such as a binder, present in the gel tube. And then, the gel tube is heated in an atmosphere of chlorine (Cl) gas to remove metallic impurities and hydrides. As a result, a molded green body is formed. This green body is a gel body molded to have a tube shape and is not yet subjected to a sintering process.

In the sintering procedure, the molded green body produced by the drying procedure is sintered so that it is glassified. As a result, a desired silica glass product is obtained. This procedure is carried out by heating the dried and impurity-removed gel to a temperature of 1,350° C. to 1,400° C. in a sintering furnace in an atmosphere of He gas.

The sintering procedure may be carried out using a sintering furnace. For the sintering procedure, the molded green body is vertically arranged in such a fashion that it is partially disposed within the sintering furnace. As the sintering furnace moves downward at a constant speed under the condition in which the temperature of the sintering furnace is increased to a reference temperature, the molded green body is locally glassified by virtue of heat generated in the sintering furnace. That is, the sintering procedure for the molded green body is carried out in a local fashion by the sintering furnace. In this regard, this sintering procedure is called a zone-sintering process. After completion of the sintering procedure, a tube-shaped silica glass product of a high purity such as a substrate tube or an over-jacket tube is obtained.

The molded green body that is formed in accordance with the above mentioned conventional method has a hollow rod, or tube, structure in which the inner diameter d3 at the top surface is the same as the inner diameter d1 at the bottom surface, and the outer diameter d4 at the top surface is the same as the outer diameter d2 at the bottom surface. However, the silica glass tube, which is produced from the molded green body having the above mentioned shape, in accordance with the sintering process involved in the above mentioned conventional method, has a tapered structure deformed from that of the molded green body in such a fashion that the outer diameter D1 at the bottom surface is more than the outer diameter D2 at the top surface. This is because the molded green body, vertically arranged in the sintering furnace, elongates downward due to the weight of the body, so that the gel particles of the molded green body are rendered to flow downward.

For example, in the case of an over-jacketing tube formed using a molded green body of 7 kg for the manufacture of an optical fiber of 250 km, the longitudinal cross section distribution may exceed a tolerance limit. The longitudinal cross section distribution value indicates the amount of deformation of the inner and outer diameters over a given axial range. The percentage value of longitudinal cross-section is calculated by {(Maximum Cross-sectional Area−Minimum Cross-sectional Area)/Average Cross-sectional Area}×100. Here, maximum cross-sectional area occurs at the bottom, where the diameter is greatest, and minimum cross-sectional area occurs at the top, where the diameter is smallest. The tolerance limit value, that is, the maximum value of longitudinal cross-section distribution allowing an acceptable silica glass tube product, is determined by trial and error. A tolerance limit of 5% is a typical limit.

Additional examples of optical fiber preform manufacture of the conventional art are seen in the following U.S. Patents. U.S. Pat. No. 5,352,259, to Oku et al., entitled Method Of Manufacturing Optical Fiber Preform, describes a method in which a rod member made of a silica-based material is disposed within a mold cavity, a molding material is loaded within the cavity and pressure is applied.

U.S. Pat. No. 5,769,921, to Yokokawa, entitled Method Of Producing Quartz Glass Body, describes a method for producing a rod or tube for an optical fiber preform. The method involves rotating a solid or hollow cylindrical substrate which has a tapered shape, and forming a porous quartz glass body on the outer surface of the substrate.

U.S. Pat. No. 6,091,500, to Bahr et al., entitled Method And Apparatus For Measuring Overclad Tubes, describes an apparatus for measuring parameters of an overclad tube, including the outside diameter and inside diameter along the length of the tube.

Where an optical fiber is manufactured using a silica glass tube with a longitudinal cross section distribution exceeding a tolerance limit, it may have a non-uniform geometric structure in a longitudinal direction. Thus, there is a problem in that optical fibers having degraded transfer loss characteristics are manufactured.

SUMMARY OF THE INVENTION

It is therefore an object of the present invention to provide improved silica glass products and an improved method for manufacturing a silica glass tube.

A further object of the invention is to provide an improved overclad tube for an optical fiber preform and an improved method of manufacturing an overclad tube for an optical fiber preform.

A yet further object of the present invention to provide a method for manufacturing a tube-shaped silica glass product having a uniform longitudinal cross section distribution.

A still further object of the invention is to provide a method which avoids a non-uniform cross-section distribution due to deformation during zone-sintering.

Another object is to provide a preform which may be drawn into an optical fiber with improved transfer loss characteristics.

These and other objects are accomplished in the present invention by providing a tube-shaped silica glass product and a method for manufacturing a tube-shaped silica glass product using a molded green body having a hollow rod structure. The process contemplates the steps of: (A) forming a molded green body of a hollow rod structure having a uniform outer diameter while having an inner diameter increasing gradually as it extends a top thereof to a bottom thereof; (B) vertically arranging the molded green body in a vertically movable sintering furnace in such a fashion that the bottom of the molded green body is downward directed; and (C) sintering the molded green body while downwardly moving the sintering furnace under a condition in which the sintering furnace is heated to a desired temperature.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
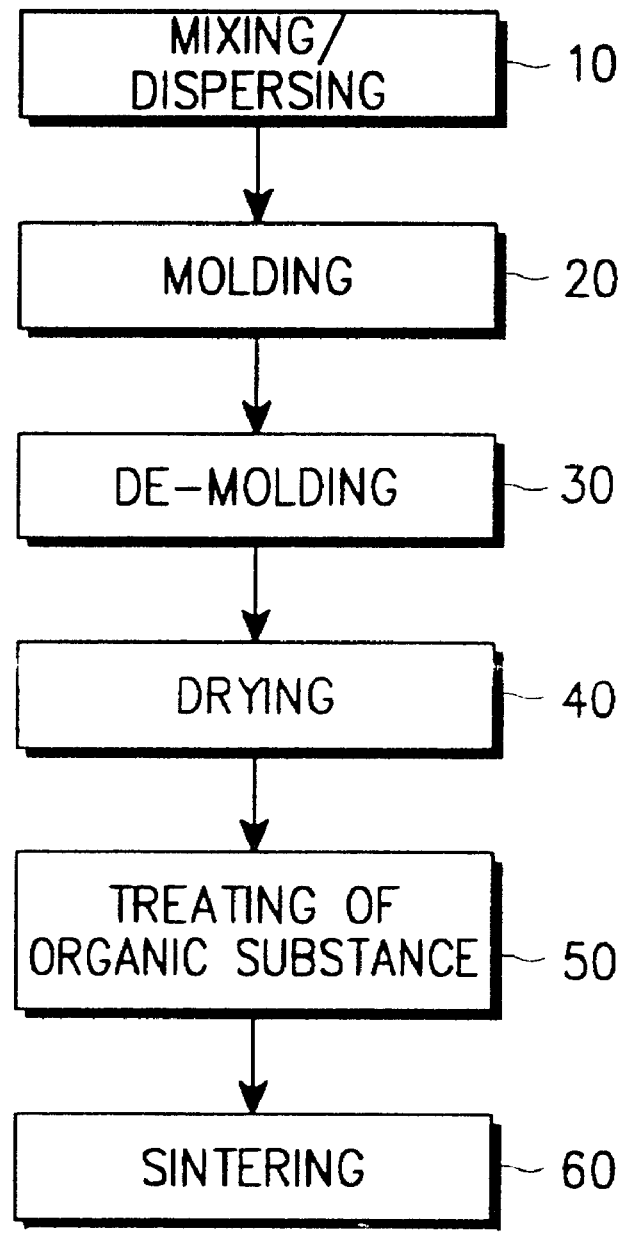
FIG. 1 is a flowchart illustrating a general method of manufacturing silica glass by a sol-gel method.
Figure 2:
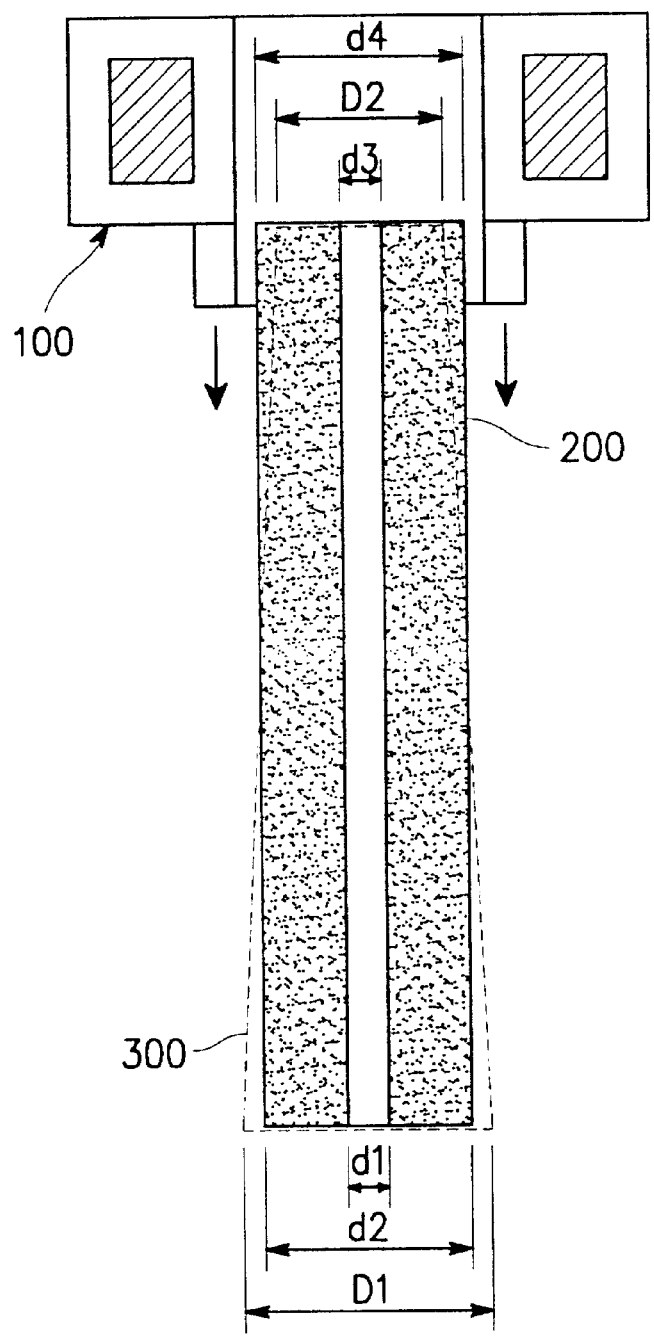
FIG. 2 is a schematic view illustrating a procedure of sintering a molded green body for the manufacture of a conventional tube-shaped silica glass product.

Turning now to the drawings, FIG. 1 is a flow chart of a general method of manufacturing a silica glass tube by the sol-gel method and FIG. 2 is a schematic view illustrating a process for sintering a molded green body to produce a tube-shaped silica glass product as described above.

As shown in FIG. 1, a silica glass tube is manufactured using a mixing/dispersing process 10, a molding process 20, a de-molding process 30, a drying process 40, an organic substance treating process 50, and a sintering process 60. In the mixing/dispersing procedure 10, a starting material is mixed with deionized water and an additive such as a dispersing agent so that the starting material is uniformly dispersed in the deionized water, thereby forming a uniform sol. The starting material may include silicon alkoxide or fumed silica.

In the molding procedure 20, the sol produced in the mixing/dispersing procedure 10 is charged into a mold having a proper shape for gelation. The sol is added with a binder and a gelling agent to aid in forming particle-to-particle bonds. The mold, which is used to mold a silica glass tube, for example, a substrate tube or an over-jacket tube, is constructed with a cylindrical portion and a central rod portion inserted in the cylindrical portion.

In the de-molding procedure 30, the gel molded to have a tube shape in the molding procedure 20 is removed from the mold. This procedure may be carried out in a water tank to prevent the gel tube from being damaged.

In the drying procedure 40, the gel tube removed from the mold is dried using a dryer with a constant temperature and humidity chamber.

In the organic substance treating procedure 50, the gel tube is subjected to a thermal treatment at a low temperature in order to remove or decompose residual moisture and any organic substances, such as a binder, present in the gel tube. And then, the gel tube is heated in an atmosphere of Cl gas to remove metallic impurities and hydrides. As a result, a molded green body is formed. This green body is a gel body molded to have a tube shape and is not yet subjected to a sintering process.

In the sintering procedure 60, the molded green body produced by the drying procedure 50 is sintered so that it is glassified. As a result, a desired silica glass product is obtained. This procedure is carried out by heating the dried and impurity-removed gel to a temperature of 1,350° C. to 1,400° C. in a sintering furnace in an atmosphere of He gas.

The sintering procedure 60 may be carried out using a sintering furnace 100 shown in FIG. 2. For the sintering procedure, the molded green body, which is denoted by the reference numeral 200 with solid outline in FIG. 2, is vertically arranged in such a fashion that it is partially disposed within the sintering furnace 100. As the sintering furnace 100 moves downward at a constant speed under the condition in which the temperature of the sintering furnace 100 is increased to a reference temperature, the molded green body 200 is locally glassified by virtue of heat generated in the sintering furnace 100. That is, the sintering procedure for the molded green body 200 is carried out with localized heating by the sintering furnace 100. This sintering procedure is called a zone-sintering process. After completion of the sintering procedure 60, a tube-shaped silica glass product of high purity such as a substrate tube or an over-jacket tube is obtained which is denoted by the reference numeral 300 and indicated by the dashed outline in FIG. 2.

As shown in FIG. 2, the molded green body 200, which is formed in accordance with the above mentioned conventional method, has a hollow rod, that is, a tube structure in which the inner diameter d3 at the top surface is the same as the inner diameter d1 at the bottom surface, and the outer diameter d4 at the top surface is the same as the outer diameter d2 at the bottom surface. However, silica glass tube 300, which is produced from the molded green body 200 having the above mentioned shape, produced by the sintering process involved in the above mentioned conventional method, has a tapered structure deformed from that of molded green body 200 such that the outer diameter D1 at the bottom surface of tube 300 is greater than the outer diameter D2 at the top surface. This is because the molded green body 200 vertically arranged in the sintering furnace 100 is downwardly elongated due to the weight of the body, so that the gel particles of the molded green body 200 are rendered to flow downward.

Various embodiments of the present invention will now be explained in detail with reference to the accompanying drawings. The present invention provides a method for manufacturing a tube-shaped silica glass product, which is characterized by a molding process for forming a molded green body, and a sintering process for glassifying the molded green body, thereby producing a silica glass tube. The molding process will be described in conjunction with FIGS. 3 and 4, and the sintering process will be described in conjunction with FIG. 5.

Figure 3:
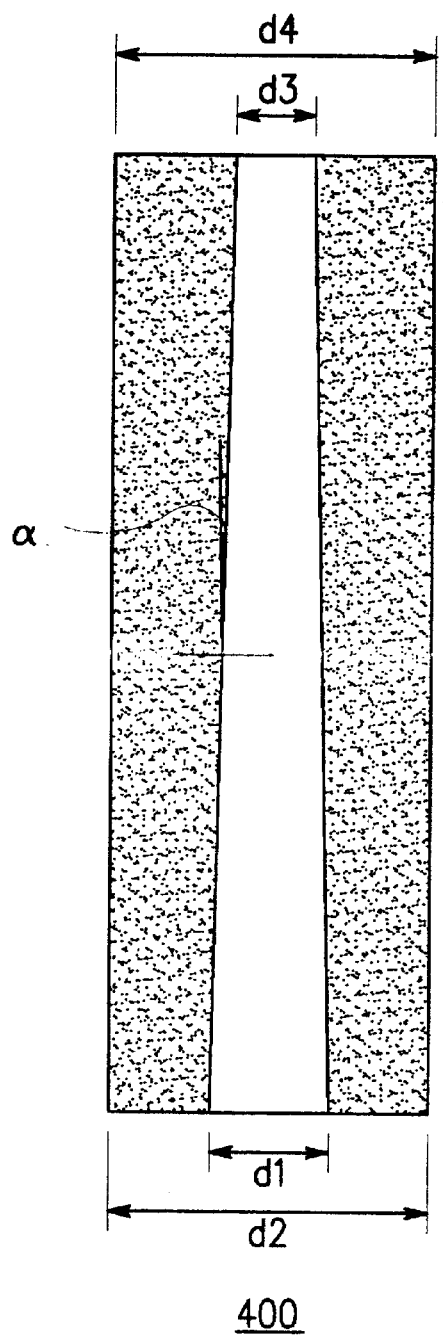
FIG. 3 is a cross-sectional view illustrating the structure of a molded green body for the manufacture of a tube-shaped silica glass product according to an embodiment of the present invention.
Figure 4:
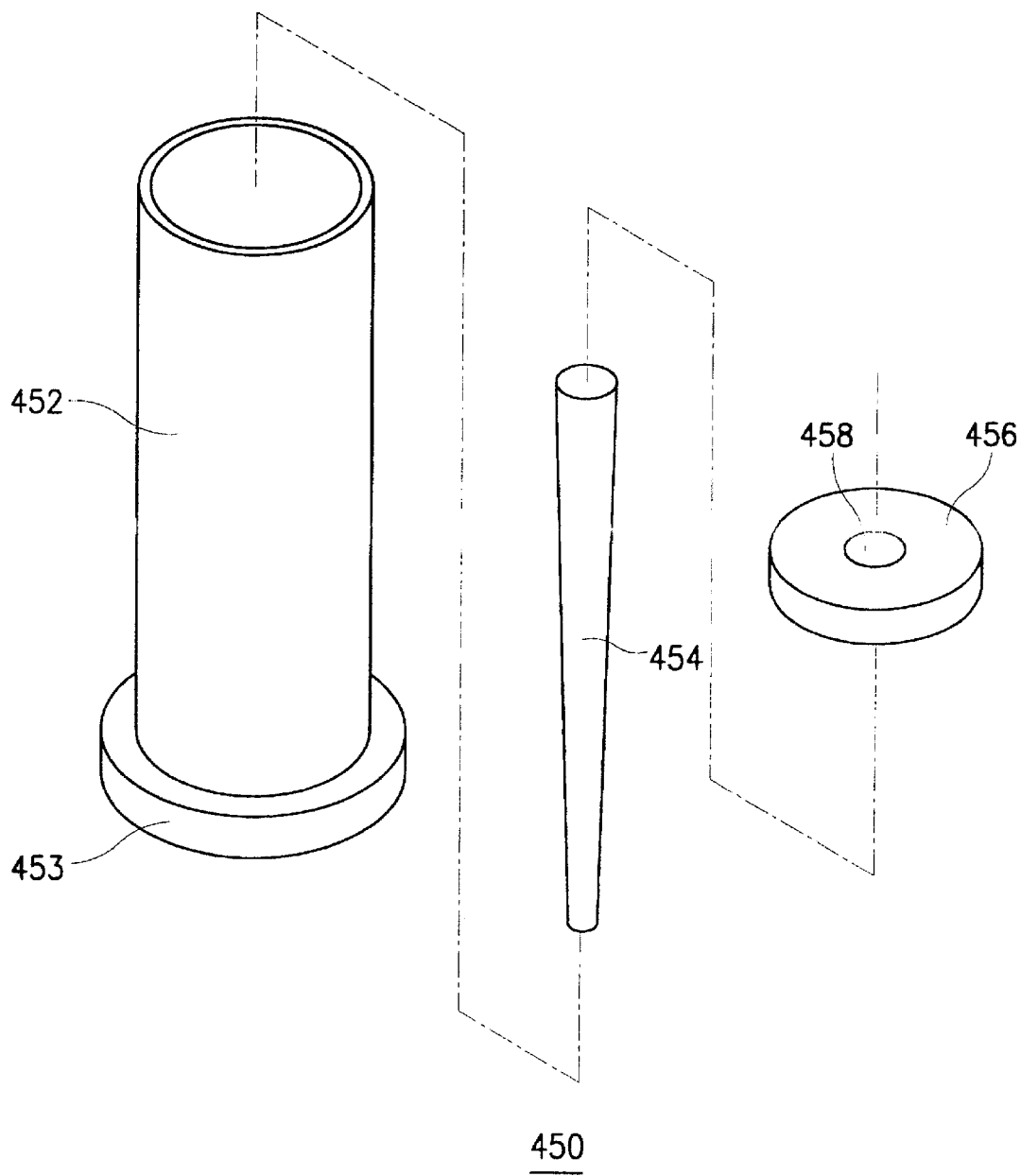
FIG. 4 is an exploded perspective view illustrating a mold for forming a molded green body according to an embodiment of the present invention.

FIG. 3 is a cross-sectional view illustrating the structure of a molded green body to be used for the manufacture of a silica glass tube in accordance with an embodiment of the present invention. FIG. 4 is an exploded perspective view illustrating a mold for forming a molded green body in accordance with an embodiment of the present invention.

As shown in FIG. 3, the molded green body of the present invention, which is denoted by the reference numeral 400, has a hollow rod, or tube, structure having a uniform outer diameter while having an inner diameter gradually increasing from the top end thereof to the bottom end thereof. That is, the molded green body 400 is configured in such a fashion that the outer diameter d4 at the top end thereof is the same as the outer diameter d2 at the bottom end thereof whereas the inner diameter d3 at the top end is less than the outer diameter d1 at the bottom end. In other words, the molded green body 400 has a tapered central hole, or bore.

In the embodiment illustrated in FIG. 3, the taper of the bore of molded green body 400 is a straight taper, that is, has straight edges when viewed in axial cross-section. That is, the taper has a truncated conical shape. Other embodiments are also possible for the shape of the taper. For example, the taper may be a curved taper, that is, have curved edges when viewed in axial cross-section.

In the embodiment shown in FIG. 3, the bore has a taper surface inclined by an angle of ($\alpha$ with respect to a vertical phantom line, that is, a line parallel to the central axis of the tube. The taper angle $\alpha$ of the hole in the molded green body 400 corresponds to a deformation degree of the molded green body resulting from the sintering temperature of the sintering furnace and the weight of the molded green body during a sintering process.

In the present invention, the molded green body 400 is formed in such a fashion that, when being sintered, the inner diameter of body 400, that is, the diameter of the central hole, increases from the top end to the bottom end of body 400, to compensate for the variation in inner/outer diameter ratio which occurs during vertical sintering. Thus, the shape of the molded green body 400 of the present invention prevents the longitudinal cross section distribution of a silica glass tube produced by a vertical sintering process from molded green body 400 from increasing over a tolerance limit due to deformation of the molded green body 400 by elongation due of the weight of body 400 during the sintering process.

Referring to FIG. 4, a mold 450 is illustrated which is used to form the molded green body according to the present invention. As shown in FIG. 4, the mold 450 includes a cylindrical member 452 and a bottom plate 453. separably attached to the lower end of the cylindrical member 452. In a central portion of bottom plate 453 is a central recess (not shown) for supporting the lower end of a central rod 454 to be inserted into the cylindrical member 452. This recess may be a circular recess for engaging the lower portion of the central rod.

The central rod 454 is an insert for forming the central hole of the molded green body 400. In order to allow the central hole of the molded green body 400 to have a tapered structure, the central rod 454 has a tapered structure having a diameter increasing gradually from one end of the rod to the other end. Accordingly, the shape of the central hole in the molded green body 400 is determined by the shape of the central rod 454. In the case of a straight taper, the taper angle of the central hole in the molded green body 400 is determined by the taper angle of the central rod 454.

A top plate 456 is also provided which is adapted to cover the open top of the cylindrical member 452. The top plate 456 is provided at the central portion thereof with a central hole 458 for supporting the upper end of the central rod 454. The surface of the central hole 458 is tapered with a corresponding shape to the taper of the central rod 454. In the case of a straight taper, the surface of central hole 458 is tapered at the same angle as the taper angle of the central rod 454.

Now, a typical procedure of forming a molded green body using the mold 450 according to the illustrated embodiment of the present invention will be described. First, a sol-phase starting material is charged into the cylindrical member 452 of the mold 450. The top plate 456 is mounted to the top of the cylindrical mold 452. Then, the central rod 454 is vertically inserted into the central hole 458 of the top plate 456. This procedure will be performed with the narrower end of central rod 454 pointing downward. An alternative embodiment of the method may be performed with the narrower end upward with the top plate mounted after the central rod using an appropriately designed mold.

Thereafter, a sol-phase starting material is charged into the cylindrical member 452 of the mold 450. For the starting material, a mixture of silicon alkoxide and deionized water may be used. A mixture of fumed silica and deionized water may also be used for the start material. If necessary, an additive such as a dispersing agent or a binding agent may also be added to the start material.

After gelation of the sol in the mold 450, the central rod 454, top plate 456, and bottom plate 453 are separated from the cylindrical member 452. The cylindrical member 452 is then dipped into a water bath in order to separate the tube-shaped molded gel from the cylindrical member 452. The molded gel has a central hole having a taper structure corresponding to that of the central rod 454.

The gel tube separated from the mold 450 is then dried using a dryer such as a constant temperature and humidity chamber. The dried gel tube is subjected to a thermal treatment at a low temperature in order to remove residual moisture present in the gel tube and to decompose any organic substances, such as a binder, present in the gel tube. And then, the gel tube is heated in an atmosphere of Cl gas to remove metallic impurities and hydrides. As a result, a molded green body is formed.

Figure 5:
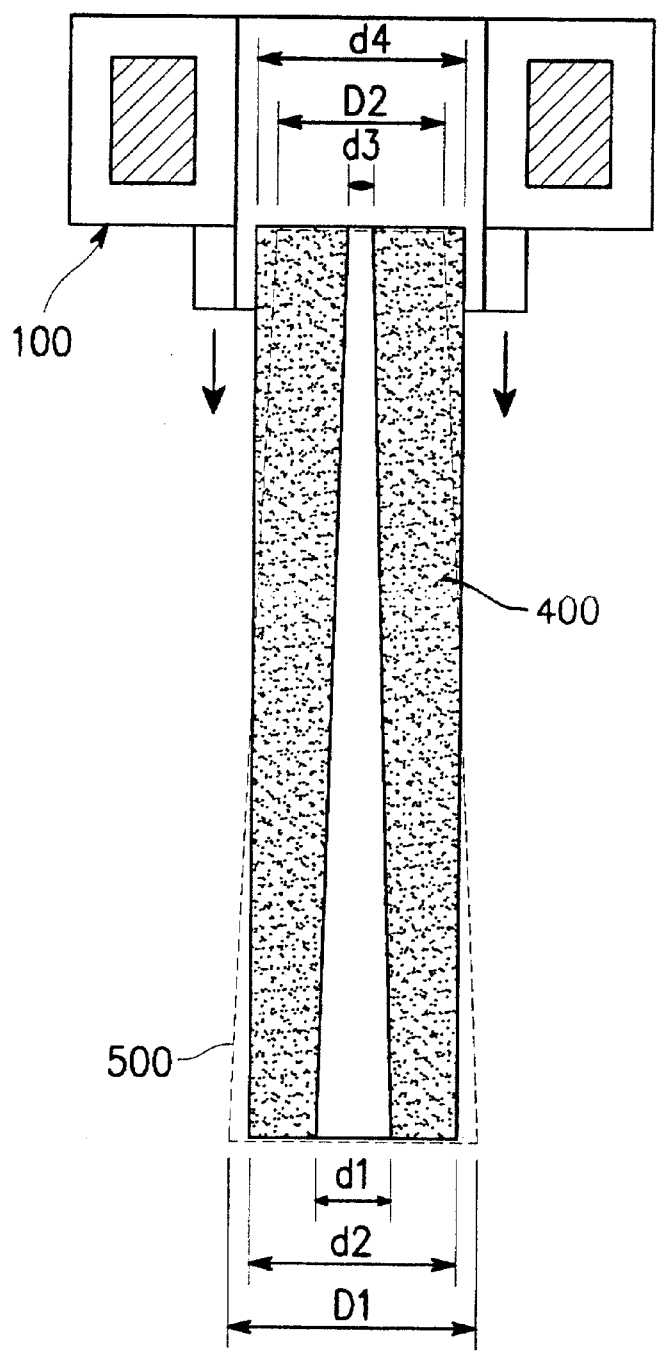
FIG. 5 is a schematic view illustrating a procedure of manufacturing a tube-shaped silica glass product by sintering the molded green body according to an embodiment of the present invention.

FIG. 5 is a schematic view illustrating a procedure of manufacturing a tube-shaped silica glass product by sintering the molded green body according to the illustrated embodiment of the present invention. As shown in FIG. 5, the molded green body 400 formed in accordance with the above mentioned procedure is subjected to a sintering process in a sintering furnace 100, so that it is formed into a silica glass tube 500.

In the sintering procedure, the molded green body 400 having a hollow structure having a taper hole is first mounted in the sintering furnace 100. At this time, the molded green body 400 is arranged in such a fashion that the smallest diameter end of the taper hole is upwardly directed. That is, the molded green body 400 is mounted in the sintering furnace 100 in such a fashion that the taper hole has a diameter increasing gradually as it extends downward.

In the mounted state of the molded green body 400, the sintering furnace 100 is heated to a predetermined sintering start temperature, and then moved downward to begin the sintering process. As the sintering process progresses, the temperature of the sintering furnace 100 is increased to a maximum critical temperature. When the sintering furnace 100 reaches an appropriate position or level, the downward movement speed of the sintering furnace 100 is lowered. At the lowered downward movement speed of the sintering furnace 100, the sintering process is continued. The sintering start temperature, the critical temperature, and the downward movement speed of the sintering furnace are experimentally determined in accordance with a desired dimension of the silica glass tube 500 and the characteristics of the sintering furnace 100.

EXAMPLE

In order to manufacture an over-jacketing tube for an optical fiber of 250 km, a molded green body having a central hole with a taper angle of 2° was formed in accordance with a molding process. The molded green body was then mounted in a sintering furnace. The sintering furnace was heated, and moved downward at a speed of 20 cm/hr when its temperature reached 1,380° C. During the downward movement, the sintering furnace was further heated to a temperature of 1,450° C. at a rate of 1° C./hr. When the temperature of the sintering furnace reached 1,440° C., the downward movement speed of the sintering furnace was lowered to 18 cm/hr. The sintering process was continued at the lowered speed of the sintering furnace.

The over-jacketing tube manufactured in this example was a silica glass tube having an inner diameter 22 mm, an outer diameter of 67 mm, and a length of 1,000 mm. The longitudinal cross section distribution of the over-jacketing tube was 2 to 4%. This range is less than the tolerance limit of 5%.

As apparent from the above description, the present invention provides a method for manufacturing a tube-shaped silica glass product having a longitudinal cross section distribution less than a tolerance limit. Where an optical fiber is manufactured by using the silica glass tube according to the present invention, it is possible for the optical fiber to have a uniform longitudinal geometrical structure, thereby exhibiting superior transmission characteristics.

While this invention has been described in connection with what is presently considered to be the most practical embodiments, it is to be understood that other modifications thereof may be made without departing from the scope of the invention. Thus, the invention should not be limited to the disclosed embodiment, but should be defined by the scope of the appended claims and their equivalents.

What is claimed is:

1. A method of making a glass product, comprising the steps of:
   molding a silica sol in the form of a tube having a cylindrical outer surface and having a bore with an inner diameter which increases gradually from one end of the tube to the other end;
   gelating the sol and treating the gelated sol to form a molded green body;
   positioning the molded green body vertically with the end having the larger inner diameter downward; and
   zone-sintering the molded green body to yield the glass product by using a sintering furnace moving downward relative to the molded green body.

2. The method of claim 1, the bore of said tube having a straight tapered shape.

3. The method of claim 2, the angle of the taper of the bore with respect to the central axis of the tube being approximately 2°.

4. The method of claim 1, the bore of said tube having a curved tapered shape.

5. The method of claim 1, said step of zone-sintering being performed to yield a sintered product characterized in having a longitudinal cross-section distribution of less than a desired tolerance limit.

6. The method of claim 5, the value of said tolerance limit being approximately 5%.

7. The method of claim 1, said step of molding the silica sol further comprising:
   charging the silica sol into a mold comprising:
      a cylindrical member having a cylindrical inner surface for defining the outside surface of the glass product;
      a rod tapering from a wider end to a narrower end, mounted axially in the center of the cylindrical member, for defining a bore of the glass product;
      a bottom plate attachable to the lower end of the cylindrical member, for forming the lower portion of the mold, said bottom plate having a central recess for receiving an end of the rod; and
      a top plate for covering the top of said cylindrical member, said top plate having a central hole for received the other end of the rod.

8. The method of claim 7, further comprising:
   said rod being mounted in the mold with the narrow end of the rod toward the bottom plate.

9. The method of claim 1, said step of treating the gelated sol to form a molded green body further comprising the steps of:
   drying the gelated sol; and
   heating the gelated sol in an atmosphere of chlorine gas, for removing impurities.

10. The method of claim 1, said step of molding a silica sol further comprising:
    forming the silica sol using silicon alkoxide and water.

11. The method of claim 1, said step of molding a silica sol further comprising:
    forming the silica sol using fumed silica and water.

* * * * *